US006429429B1

(12) United States Patent
Fohl et al.

(10) Patent No.: US 6,429,429 B1
(45) Date of Patent: Aug. 6, 2002

(54) NIGHT VISION SYSTEM UTILIZING A DIODE LASER ILLUMINATION MODULE AND A METHOD RELATED THERETO

(75) Inventors: Timothy Fohl, Carlisle, MA (US); Jeffrey Thomas Remillard, Ypsilanti; Willes H. Weber, Ann Arbor, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 55 days.

(21) Appl. No.: 09/598,284

(22) Filed: Jun. 22, 2000

(51) Int. Cl.[7] .................................................. G01J 5/02
(52) U.S. Cl. ............... 250/353; 250/338.1; 250/339.06; 250/340
(58) Field of Search ............................. 250/353, 338.1, 250/339.06, 340

(56) References Cited

U.S. PATENT DOCUMENTS

| 4,707,595 A | | 11/1987 | Meyers ................... 250/504 R |
| 5,001,558 A | * | 3/1991 | Burley et al. ................ 358/113 |
| 5,414,439 A | | 5/1995 | Groves et al. .................. 345/7 |
| 5,700,078 A | | 12/1997 | Fohl et al. ..................... 362/32 |
| 5,791,757 A | | 8/1998 | O'Neil et al. ................ 362/556 |
| 5,890,796 A | * | 4/1999 | Marinelli et al. ............ 362/307 |
| 5,962,843 A | | 10/1999 | Sinor et al. ............ 250/214 VT |
| 6,144,031 A | * | 11/2000 | Herring et al. ............. 250/353 |
| 6,300,632 B1 | * | 10/2001 | Liu et al. ..................... 250/353 |

OTHER PUBLICATIONS

M. Holz and E. Weidel of Daimler–Benz Research Center, *Night Vision Enhancement System Using Diode Laser Headlights,* 1998, pp. 1–4.

* cited by examiner

*Primary Examiner*—Georgia Epps
*Assistant Examiner*—M. Hasan
(74) *Attorney, Agent, or Firm*—John F. Buckert; Allan J. Lippa

(57) ABSTRACT

A night vision system 10 is provided for detecting objects at relatively low visible light levels. The system 10 includes an infrared light source 14. The system 10 further includes a thin sheet optical element 16 extending along a first axis 27 receiving light from the infrared light source 14 and reflecting the light generally in a first direction. Finally, the system 10 includes an infrared camera for receiving the light reflected off objects in the environment and generating a video signal responsive to the received light.

25 Claims, 3 Drawing Sheets

NIGHT VISION SYSTEM UTILIZING A DIODE LASER ILLUMINATION MODULE AND A METHOD RELATED THERETO

FIELD OF THE INVENTION

This invention relates to a night vision system for detecting objects at relatively low visible light levels. In particular, the invention relates to a night vision system utilizing a thin sheet optical element to emit infrared light and an infrared camera that detects the infrared light reflected off of objects in the environment.

BACKGROUND OF THE INVENTION

Night vision systems are utilized to allow a user to see objects at relatively low visible light levels. Further, night vision systems may be classified as either passive night vision systems or active night vision systems. In known passive night vision systems used in automotive vehicles, mid-infrared cameras are used to image objects using the ambient infrared light emitted by the objects in the environment. Mid-infrared cameras generally used in automotive applications have a relatively small number of pixels. Accordingly, images formed using such cameras have a low video resolution and a relatively narrow field-of-view. Further disadvantages of night vision systems using mid-infrared cameras include (i) a relatively high manufacturing cost, (ii) generated images that are generally harder for a user to interpret than images formed using CCD or CMOS cameras, (iii) a potentially poor image contrast, and (iv) operational restrictions on the location of the camera resulting in a negative impact to the vehicle styling.

A known active night vision system utilizes an infrared diode laser or an incandescent light source and relatively large diameter lenses or reflectors to emit infrared light. The infrared light is subsequently reflected off objects in the environment and is received by an infrared camera. The infrared camera generates a video signal responsive to the received light. A disadvantage of the known active night vision system is that the lens or reflector-based illuminator package is relatively large. Accordingly, the known active system cannot be packaged in a small volume and placed on top of a dash or in a rear view mirror assembly of an automotive vehicle.

There is thus a need for a night vision system and a method related thereto that minimizes for reduces one or more of the above-mentioned deficiencies.

SUMMARY OF THE INVENTION

The present invention provides a night vision system and a method related thereto for detecting objects at relatively low visible light levels.

The night vision system in accordance with the present invention includes an infrared light source such as an infrared diode laser. The system further includes a thin sheet optical element extending along a first axis that receives light from the infrared light source and reflects the light generally in a first direction. Finally, the system includes an infrared camera for receiving the light reflected off of an object in the environment and generating a video signal responsive to the received light.

A method for detecting objects in accordance with the present invention includes a step of transmitting infrared light to a thin sheet optical element. The method further includes a step of reflecting the light from the thin sheet optical element generally in a first direction from the thin sheet optical element. The method further includes a step of receiving the light reflected off of an object in the environment. Finally, the method includes a step of generating a video signal responsive to the received light.

The night vision system and the method related thereto in accordance with the present invention represents a significant improvement over conventional systems and methods. In particular, the system may be packaged in a relatively small volume since the thin sheet optical element is extremely thin as compared with conventional lenses/illuminators. Accordingly, the inventive system may be located in a greater number of locations in an automotive vehicle. Further, the inventive system is less expensive, has a larger field-of-view, and provides higher quality images than known passive night vision systems.

These and other features and advantages of this invention will become apparent to one skilled in the art from the following detailed description and the accompanying drawings illustrating features of this invention by way of example.

DETAILED DESCRIPTION OF THE PREFERRED EMBODIMENT

Figure 1:
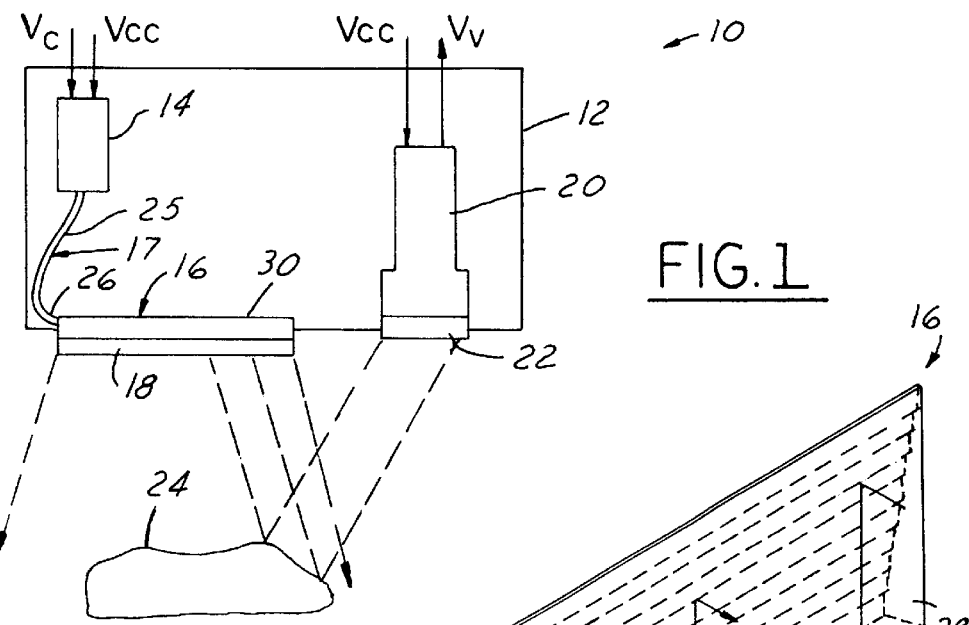
FIG. 1 is a combination schematic and block diagram of a night vision system in accordance with the present invention.

Referring now to the drawings wherein like reference numerals are used to identify identical components in the various views, FIG. 1 illustrates a night vision system 10 for detecting objects at relatively low visible light levels. The system 10 may be utilized in a plurality of applications. For example, the system 10 may be used in an automotive vehicle (not shown) to allow a driver to see objects at night that would not be visible to the naked eye. Further, the system 10 could be utilized as part of a security system wherein a user could see objects at night in a monitored area. As illustrated, the system 10 includes a housing 12 which holds the remaining components of the system 10. It should be understood, however, that the components of system 10 contained in housing 12 could be disposed at different locations wherein the housing 12 would not be needed. For example, the components of the system 10 could be disposed at different operative locations in the automotive vehicle so that a single housing 12 would be unnecessary. Referring to FIG. 1, the system 10 further includes an infrared light source 14, a thin sheet optical element 16, a fiber optic cable 17, a holographic diffuser 18, an infrared camera 20, and an optical bandpass filter 22. As will be discussed in more detail hereinbelow, the system 10 may be used to detect any reflective object, such as an object 24, in operative proximity to the system 10.

The housing 12 is provided to enclose and protect the various components of the system 10. The housing 12 may be constructed from a plurality of materials including metals and plastics.

The infrared light source 14 is provided to generate infrared light. Many objects in the environment that are dark in the visible light spectrum are brightly illuminated in the infrared light spectrum. Accordingly, it is advantageous to use an infrared light source when trying to detect objects at night. The light source 14 is conventional in the art and may comprise an infrared diode laser. As illustrated, the light source 14 receives an operational voltage $V_{cc}$ from an external voltage source (not shown). Further, the light source 14 receive a control voltage $V_c$ from an external controller (not shown) and generate the infrared light responsive to the control voltage $V_{cc}$. In one constructed embodiment, the light source 14 was a Single Stripe Diode Laser, Model No. S-813000-C-200-H manufactured by Coherent, Inc. of Santa Clara, Calif. As illustrated, the light source 14 may be disposed in the housing 12. Further, the light source 14 may be connected to a first end 25 of the fiber optic cable 17 using a conventional light coupler (not shown) as known by those skilled in the art. The second end 26 of fiber optic cable 17 is operatively disposed adjacent to the thin sheet optical element 16. Although the system 10 preferably utilizes an infrared light source 14, an alternate embodiment of system 10 may utilize a conventional light source that emits visible light (including infrared light), such as a halogen bulb, in lieu of the infrared diode laser 14.

The fiber optic cable 17 is utilized to transmit light from the light source 14 to the thin sheet optical element 16. Because of the high brightness (candela per unit area) of the light source 14, cable 17 preferably is a relatively small diameter (0.1–1.0 mm) glass fiber. The use of a small diameter glass fiber provides several benefits over monofilament plastic pipes and glass fiber bundles used in non-laser based remote lighting systems. A small diameter glass fiber is less bulky than plastic pipes or glass fiber bundles that typically are 10–12 mm in diameter. Further, a small diameter glass fiber is significantly less expensive than monofilament plastic pipes or glass fiber bundles. Still further, a small diameter glass fiber is easier to package, handle, and to install than monofilament plastic pipes or glass fiber bundles.

Figure 2:
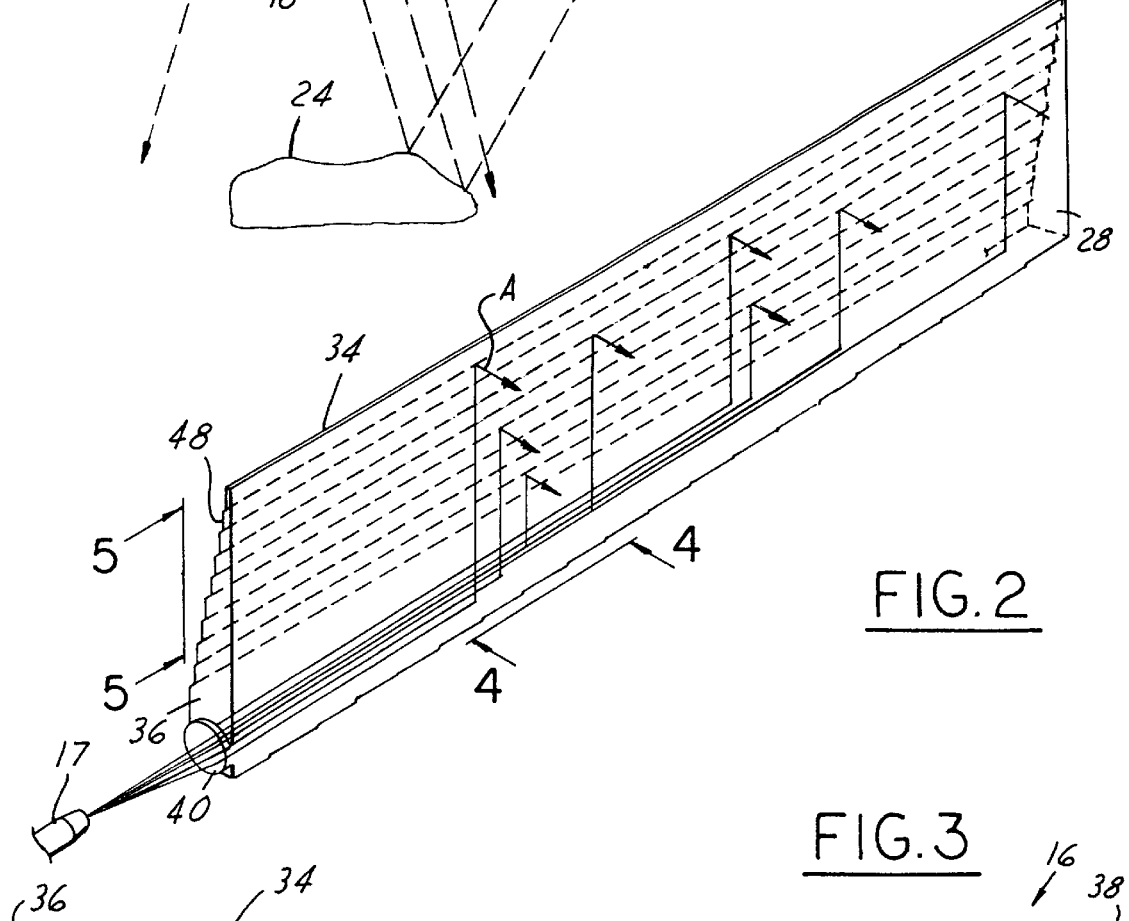
FIG. 2 is a perspective view of a thin sheet optical element utilized in the night vision system of FIG. 1.
Figure 3:
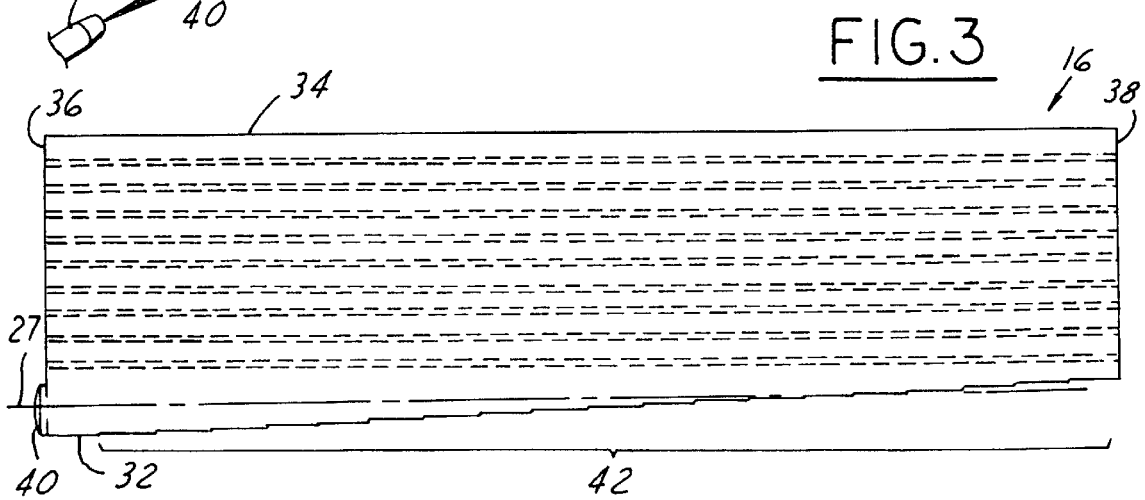
FIG. 3 is a front view of the thin sheet optical element of FIG. 2.

The thin sheet optical element 16 is provided to reflect and expand light (represented by arrows A) generated by the light source 14 generally in a first direction from the element 16. In a preferred embodiment, shown in FIGS. 2 and 3, the element 16 comprises a unitary sheet of optical material extending generally along a first axis 27. The element 16 preferably has a thickness range from 3–9 mm. It should be understood, however, that the element 16 may have a thickness less than 3 mm or greater than 9 mm. The element 16 is preferably constructed from a transparent, solid piece of plastic such as polycarbonate and utilizes the principle of total internal reflection (TIR) to reflect light. TIR is explained in more detail hereinbelow. The element 16 may also be constructed from other transparent materials such as acrylics. Referring to FIGS. 1, 2 and 3, the element 16 includes a front surface 28, a back surface 30, a bottom surface 32, a top surface 34, side surfaces 36, 38, and an aspheric lens 40.

Figure 4:
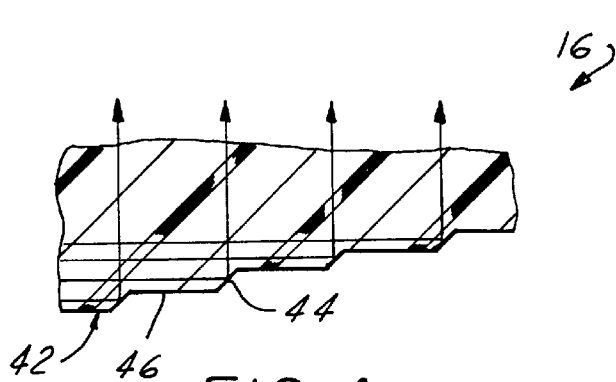
FIG. 4 is an enlarged fragmentary sectional view of the thin sheet optical element of FIG. 2 taken along lines 4—4.

Referring to FIGS. 3 and 4, the bottom surface 32 of element 16 defines a first plurality of reflective steps 42 extending generally along the axial length of the element 16. Each of the reflective steps 42 includes a reflective facet 44 and a tread portion 46. As illustrated, each tread portion 46 is generally parallel to the axis 27. Each reflective facet 44 is oriented at approximately a 45° angle relative to the adjacent tread portion 46. It should be understood, however, that the angle of each reflective facet 44 may vary depending upon the critical angle (discussed further hereinbelow) of the respective facet 44. Further, the reflective facet 44 may have a curved shape (not shown) to further direct the infrared light in a desired direction. Still further, the number of reflective steps 42 may vary, and correspondingly, the number of reflective facets 44 may vary.

The reflective facets 44 utilize the principle of TIR to reflect infrared light received from the aspheric lens 40 towards the reflective facets 50. Total internal reflection of the light occurs when the incident angle θ exceeds the critical angle $θ_c$ given by the equation $θ_c = \sin^{-1}(n_1/n_2)$ wherein $n_1$ is the index of a refraction of air and $n_2$ is the index of a refraction of the polymeric material used to construct the element 16. In an alternate embodiment (not shown), the reflective facets 44 can be metalized if the light strikes the facets 44 at an angle less than the critical angle.

Figure 5:
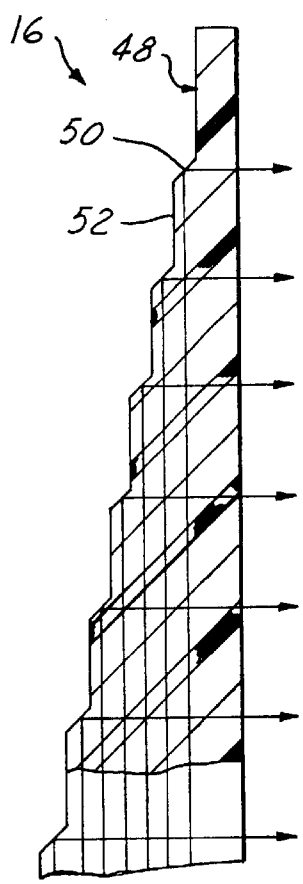
FIG. 5 is an enlarged fragmentary sectional view of the thin sheet optical element of FIG. 2 taken along lines 5—5.

Referring to FIGS. 1, 2 and 5, the back surface 30 defines a second plurality of reflective steps 48 extending generally perpendicular to the axis 27. Each of the reflective steps 48 includes a reflective facet 50 and a tread portion 52. As illustrated, each tread portion 52 is generally perpendicular to the axis 27 and parallel to the front surface 28. Each reflective facet 50 is oriented at approximately a 45° angle relative to the adjacent tread portion 52. It should be understood, however, that the angle of each reflective facet 50 may vary depending upon the critical angle of the respective facet 50. Further, each reflective facet 50 may have a curved shape (not shown) to further direct the light in a desired direction. Still further, the number of reflective steps 48 may vary, and correspondingly, the number of reflective facets 50 may vary. Referring to FIGS. 4 and 5, the facets 50 are aligned to receive light reflected from one or more reflective facets 44, and, like the facets 44, utilize the principle of TIR. The facets 50 reflect the received light through the front surface 28 of the element 16 as will be described in further detail hereinafter. In an alternate embodiment (not shown), the reflective facets 50 can be metalized if the light from the reflective facets 44 strikes the facets 50 at an angle less than the critical angle.

Referring to FIG. 2, the aspheric lens 40 is provided to collimate the light exiting the fiber optic cable 17. The axial distance between the cable 17 and the lens 40 is chosen such that the light diverging from the cable 17 fills the aperature of lens 40. The lens 40 is preferably constructed to have a surface of revolution about the axis 27 with a circular or hyperbolic cross section. As illustrated, the element 40 is disposed on the side surface 36 of the element 16 and may be integral with the element 16. In an alternate embodiment of the element 16, the lens 40 may comprise a separate lens disposed in operative proximity to the element 16.

Referring to FIGS. 1 and 2, the infrared light generated by the infrared light source 14 is received by the element 16 from the second end 26 of the fiber optic cable 17. The light being emitted from the second end 26 preferably has a spread angle between 20–50°. It should be understood, however, that the spread angle may be less than 20° or greater than 50° depending upon the light characteristics of the cable 17. The emitted light enters the element 16 through the aspheric lens 40 disposed on the side surface 36 of the element 16. As discussed previously, the element 40 collimates the light, which then propagates toward the reflective facets 44. The reflective facets 50 receive the light reflected from the facets 44 and further reflect the light through the front surface 28 of the element 16 generally in a first direction.

Referring to FIG. 1, the holographic diffuser 18 is provided to receive infrared light emitted from the thin sheet optical element 16 and to diffuse the light prior to being emitted into the environment. Further, the diffuser 18 in conjunction with the element 16 allows the emitted light to meet a Maximum Permissible Exposure light level requirement as specified in an ANSI standard described in more detail hereinbelow. Still further, the diffuser 18 allows the system 10 to spread the infrared light over the required field-of-view. The diffuser 18 is conventional in the art and may be disposed proximate to or integral with the front surface 28 of the element 16. In a constructed embodiment of the system 10, the diffuser 18 has a vertical spread angle of 5° and a horizontal spread angle of 20°. However, in an alternate embodiment (not shown), the reflective facets 50 of element 16 may be oriented at varying angles with respect to one another to diffuse the infrared light. Accordingly, in the alternate embodiment, the diffuser 18 would not be needed. In another alternate embodiment, an array of lenses (pillow optics) disposed across the exit surface 28 of the element 16 may be used to diffuse the light instead of the diffuser 18.

The infrared camera 20 is provided to generate a video signal $V_v$ responsive to reflected infrared light received by the camera 20. The camera 20 is conventional in the art and may comprise a CCD camera or a CMOS camera. In a constructed embodiment of the system 10, the CCD Camera Model No. WAT902HS manufactured by the Watec American Corporation of Las Vegas, Nevada was utilized. As illustrated in FIG. 1, the infrared camera 20 receives an operational voltage $V_{cc}$ from an external voltage supply (not shown). Infrared light emitted from the thin sheet optical element 16 is reflected off of an object 24 in the environment and is received by the infrared camera 20. The video signal $V_v$ may be applied to a television monitor (not shown) or a heads-up display (not shown) in an automotive vehicle to allow a user to see the object 24.

The optical bandpass filter 22 is provided to filter the infrared light reflected from the object 24. In particular, the filter 22 only allows light within the infrared light spectrum to be received by the camera 20. Preferably, the filter 22 allows a maximum transmission of light at a wavelength equal to the wavelength of light generated by the infrared light source 14. An advantage of using the filter 22 is that the filter 22 prevents blooming (i.e., saturation of the pixel elements) in the camera 20 by visible light emitted from the head lamps (not shown) of other automotive vehicles. The filter 22 is conventional in the art and is preferably disposed proximate to a receiving lens (not shown) of the camera 20.

The American National Standards Institute has implemented the American National Standard for Safe Use of Lasers (ANSI Z136.1), hereinafter referred to as the ANSI Standard. The ANSI Standard sets forth guidelines for systems (such as night vision systems) that utilize lasers. In particular, the ANSI Standard specifies that for a given laser wavelength, viewing time, illuminator size, and beam divergence, the irradiance (power per unit area) at a given distance from the illuminator (i.e., element 16) must be less than the Maximum Permissible Exposure (MPE) as stated in the ANSI Standard.

Figure 6:
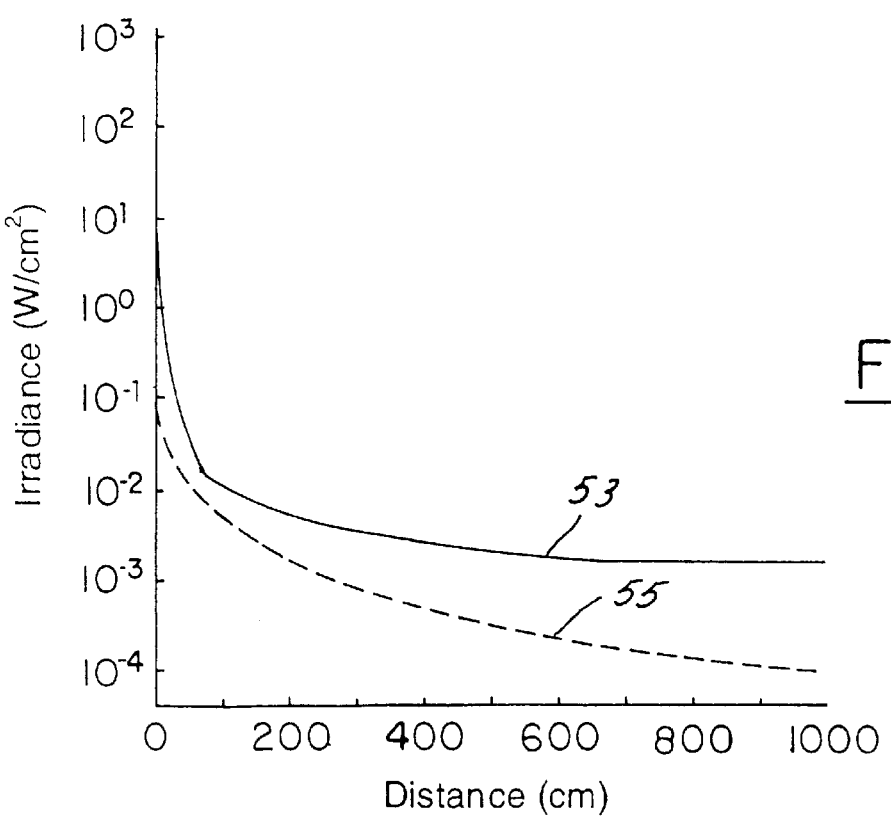
FIG. 6 is a graph showing the operational performance of a night vision system in accordance with the present invention.

Referring to FIG. 6, a graph illustrates the operational characteristics of the night vision system 10 as compared with the ANSI Standard. In particular, line 53 graphically illustrates the MPE in accordance with the ANSI Standard. Further, dashed line 55 illustrates the light irradiance as a function of distance emitted by the thin sheet optical element 16 when (i) the area of the front surface 28 is 7×7 cm², (ii) the horizontal and vertical divergence angles of emitted infrared light are 20° and 5°, respectively, (iii) the wavelength of the infrared light is 810 nm, and, (iv) the emitted power of the infrared light is 3 Watts. As illustrated, the irradiance of the element 16 is less than the MPE at all distances. Accordingly, the night vision system 10 meets the MPE requirements of the ANSI Standard.

Figure 7A:
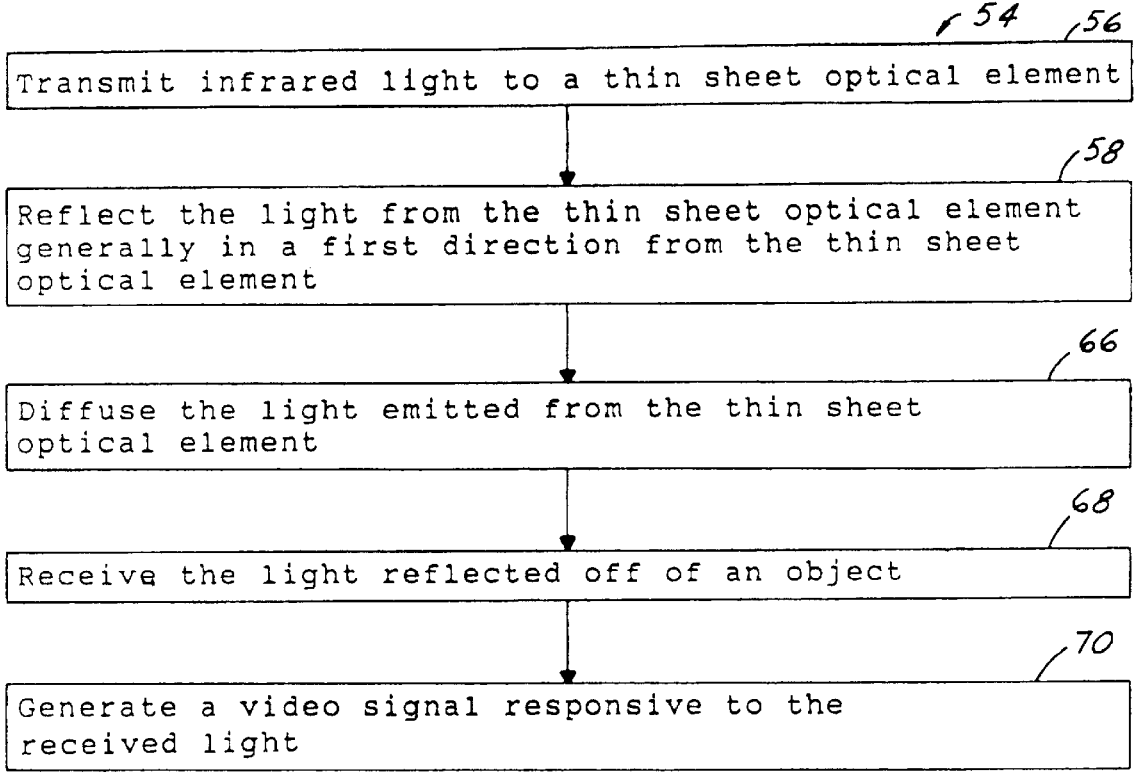
FIGS. 7A—7C are flow charts illustrating a method for detecting objects in accordance with the present invention.
Figure 7B:
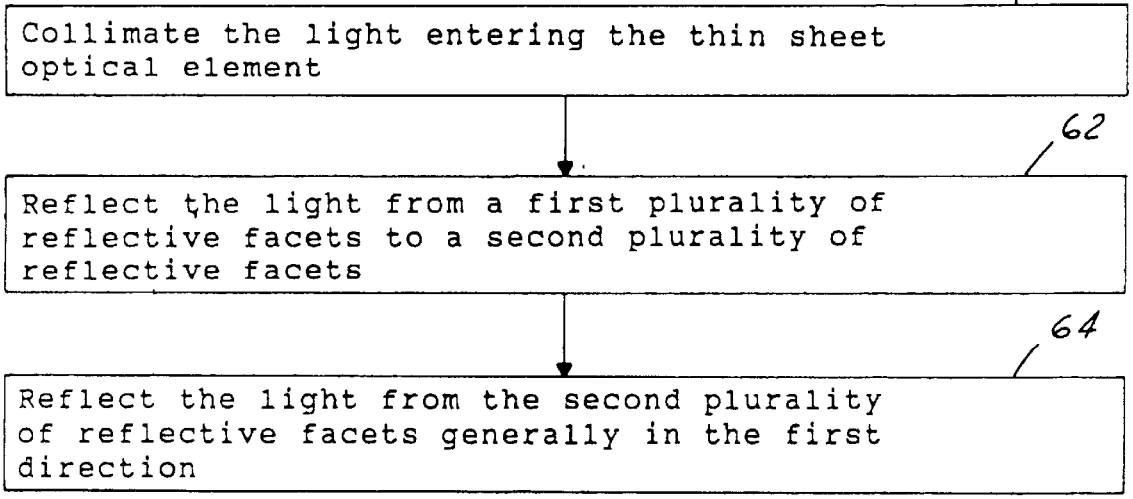
Figure 7C:
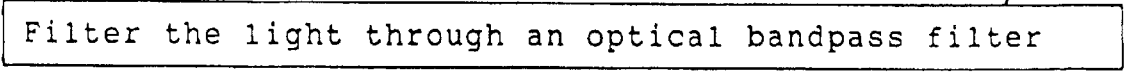

Referring to FIG. 7A, a method 54 for detecting an object 24 utilizing a night vision system 10 in accordance with the present invention is illustrated. The inventive method 54 may include a step 56 of transmitting infrared light to the thin sheet optical element 16. As previously discussed, the infrared light is transmitted to the element 16 via the fiber optic cable 17. The method 54 may further include a step 58 of reflecting the light from the thin sheet optical element 16 generally in a first direction from the element 16. Referring to FIG. 7B, the step 58 may include the substeps 60, 62, and 64. The substep 60 involves collimating the light entering the element 16. The substep 62 involves reflecting the light from the reflective facets 44 to the reflective facets 50. The substep 64 involves reflecting the predetermined number of light beams from the reflective facets 50 generally in the first direction through the front surface 28 of the element 16. Referring to FIG. 7A, the method 54 may further include a step 66 of diffusing the light emitted from the element 16. The method 54 may further include a step 68 of receiving the light reflected off of an object 24 in the environment. The object 24 may be one or more reflective objects that are disposed generally in the first direction from the element 16. For example, if the system 10 is utilized in an automotive vehicle (not shown), the object 24 could be a road surface, a pedestrian, or an animal. Referring to FIG. 7C, the step 68 may include a substep 72 of filtering the light through an optical band pass filter 22. Referring again to FIG. 7A, the method 54 may further include a step 70 of generating a video signal $V_v$ responsive to the received light.

The night vision system 10 and the method related thereto in accordance with the present invention represent a significant improvement over conventional night vision systems and methods. In particular, the system 10 may be packaged in a relatively small package volume since the thin sheet optical element 16 is extremely thin as compared with conventional lenses/illuminators. For example, the system 10 may be packaged on the dashboard or inside a rearview mirror assembly in the interior of the automotive vehicle. Thus, the system 10 provides for greater design flexibility in automotive vehicles and in other applications where a small package volume is required. Another advantage of the system 10 is that the laser light emitted from the element 16 meets the ANSI Standard described hereinabove. Further, the inventive system 10 is less expensive, has a larger field-of-view, and provides higher quality images than known passive night vision systems.

While the invention has been particularly shown and described with reference to the preferred embodiment thereof, it is well understood by those skilled in the art that various changes and modifications can be made in the invention without departing from the spirit and the scope of the invention.

We claim:
1. A night vision system, comprising:
   an infrared light source;
   a thin sheet optical element extending along a first axis receiving light from said infrared light source and reflecting said light generally in a first direction; and,
   an infrared camera for receiving said light reflected off of an object and generating a video signal responsive to said received light.

2. The night vision system of claim 1 wherein said infrared light source is an infrared diode laser.

3. The night vision system of claim 1 wherein said thin sheet optical element includes a first and second plurality of reflective facets, said first plurality of reflective facets receiving said light from said infrared light source and reflecting said light to a second plurality of reflective facets that further reflect said light from said thin sheet optical element generally in said first direction.

4. The night vision system of claim 3 wherein said thin sheet optical element includes a front surface, a back surface, a bottom surface, and a side surface connected between said front, back, and bottom surfaces, said bottom surface defining a first plurality of reflective steps extending along an axial length of said thin sheet optical element, said first plurality of reflective steps including said first plurality of reflective facets, said back surface defining a second plurality of reflective steps extending generally perpendicular to said first axis, said second plurality of reflective steps including said second plurality of reflective facets aligned to receive said light reflected from said first plurality of reflective facets and to further reflect said light through said front surface.

5. The night vision system of claim 1 wherein said thin sheet optical element is comprised of a polymeric material.

6. The night vision system of claim 1 wherein said thin sheet optical element further includes an aspheric lens disposed integral with or on said thin sheet optical element, said lens receiving said light from said infrared light source and collimating said light, said light being transmitted from said lens through said thin sheet optical element to said first plurality of reflective facets.

7. The night vision system of claim 1 further comprising a fiber optic cable transmitting said light from said infrared light source to said thin sheet optical element.

8. The night vision system of claim 1 further comprising an optical bandpass filter for filtering said light entering said infrared camera.

9. The night vision system of claim 1 further comprising a holographic diffuser or lens array disposed proximate said thin sheet optical element to diffuse said light being emitted from said thin sheet optical element.

10. A night vision system, comprising:

an infrared light source;

a thin sheet optical element having an aspheric lens and a first and second plurality of reflective facets, said aspheric lens being integral with or proximate to said thin sheet optical element and receiving light from said infrared light source and collimating said light; said first plurality of reflective facets receiving said light from said aspheric lens and reflecting said light to said second plurality of reflective facets that further reflect said light generally in a first direction; and, an infrared camera for receiving said light reflected off of an object and generating a video signal responsive to said received light.

11. The night vision system of claim 10 wherein said infrared light source is an infrared diode laser.

12. The night vision system of claim 10 wherein said thin sheet optical element includes a front surface, a back surface, a bottom surface, and a side surface connected between said front, back, and bottom surfaces, said bottom 5 surface defining a first plurality of reflective steps extending along an axial length of said thin sheet optical element, said first plurality of reflective steps including said first plurality of reflective facets, said back surface defining a second plurality of reflective steps extending generally perpendicular to said first axis, said second plurality of reflective steps including said second plurality of reflective facets aligned to receive said light reflected from said first plurality of reflective facets and to further reflect said light through said front surface.

13. The night vision system of claim 10 wherein said thin sheet optical element is comprised of a polymeric material.

14. The night vision system of claim 10 further comprising a fiber optic cable transmitting said light from said infrared light source to said thin sheet optical element.

15. The night vision system of claim 9 further comprising an optical bandpass filter for filtering said light entering said infrared camera.

16. The night vision system of claim 10 further comprising a holographic diffuser or lens array disposed proximate said thin sheet optical element to diffuse said light being emitted from said thin sheet optical element.

17. A method of detecting objects utilizing a night vision system, comprising the steps of:

transmitting infrared light to a thin sheet optical element;

reflecting said light from said thin sheet optical element generally in a first direction from said thin sheet optical element;

receiving said light reflected off of an object; and, generating a video signal responsive to said received light.

18. The method of claim 17, wherein said step of reflecting said light, includes the substeps of:

collimating said light entering said thin sheet optical element;

reflecting said light from a first plurality of reflective facets to a second plurality of reflective facets; and, reflecting said light from said second plurality of reflective facets generally in said first direction.

19. The method of claim 17 wherein said step of receiving said light reflected off of said object includes the substep of:

filtering said light through an optical bandpass filter.

20. The method of claim 17 further comprising the step of diffusing said light reflected from said thin sheet optical element.

21. A night vision system, comprising:

an infrared light source;

a light reflector receiving infrared light from said infrared light source and reflecting said light from a first reflective surface in said reflector to a second reflective surface in said reflector, said light being further reflected from said second reflective surface toward an object; and, an infrared detector configured to receive said light reflected off said object.

22. A night vision system, comprising:

an infrared light source;

a polymeric light reflector receiving infrared light from said infrared light source and reflecting said light toward an object; and, an infrared detector configured to receive said light reflected off said object.

23. A night vision system, comprising:

a light source generating light at a non-visible frequency;

a polymeric light reflector receiving said light from said light source and reflecting said light toward an object; and, a light detector configured to receive said light reflected off said object.

24. A night vision system comprising:

an infrared light source generating infrared light;

a light reflector having a transparent portion and a reflective surface, said infrared light moving through said transparent portion to said reflective surface, said surface reflecting said light toward an object; and, an infrared detector configured to receive said light reflected off said object.

25. A method for an detecting an object using a night vision system, comprising:

transmitting infrared light to a light reflector;

reflecting said light from a first reflective surface in said reflector to a second reflective surface in said reflector;

reflecting said light from said second reflective surface toward an object; and, receiving said light reflected off of said object utilizing an infrared detector.

\* \* \* \* \*